United States Patent [19]
Banks et al.

[11] 3,751,624
[45] Aug. 7, 1973

[54] BUTT BRAZING APPARATUS AND METHOD

[75] Inventors: Raymond H. Banks, Wappingers Falls; Neal D. Gillespie; Adolph W. Rzant, both of Poughkeepsie, all of N.Y.

[73] Assignee: International Business Machines Corporation, New York, N.Y.

[22] Filed: June 29, 1972

[21] Appl. No.: 267,279

[52] U.S. Cl. .................... 219/85, 219/86, 29/628
[51] Int. Cl. ............................................. B23k 1/04
[58] Field of Search .................. 219/85, 86, 91, 78, 219/117; 29/628

[56] References Cited
UNITED STATES PATENTS

| | | | |
|---|---|---|---|
| 3,384,958 | 5/1968 | Christian et al. | 29/628 |
| 2,953,673 | 9/1960 | Bouton et al. | 219/85 |
| 3,320,661 | 5/1967 | Manko | 29/628 |
| 3,126,619 | 3/1964 | Brent | 29/628 X |
| 3,263,059 | 7/1966 | Rzant | 219/91 |

Primary Examiner—J. V. Truhe
Assistant Examiner—L. A. Schutzman
Attorney—Harold H. Sweeney, Jr. et al.

[57] ABSTRACT

A metallic bonding system for butt-brazing miniature wires is provided which utilizes a small composite wire which includes a section of brazing material. The fine wire is to be butt-brazed to a pad member to form an electrical connection. A first conductive member forms a first electrode and a second conductive member forms a second electrode. Each of these electrodes contains a wire holding section for holding the small composite wire near one end thereof. A power supply is connected at one end of each of the first and second conductive members and a high resistance member is connected across the other end thereof. The power supply provides a controlled current pulse of sufficient duration to cause heating in the wire holding section to melt the insulation and contact the small composite wires, thereby completing a circuit through the small composite wires which heats up sufficiently to cause the brazing material section of the wire to form a braze between the end of the wire and the pad member.

7 Claims, 7 Drawing Figures

PATENTED AUG 7 1973 3,751,624

BUTT BRAZING APPARATUS AND METHOD

The invention relates to the metallic bonding for miniature wires, and more particularly, to apparatus and method for the brazing of the tip of a miniature wire to another member.

The micro-miniaturization of electronic components has created the need of making a large number of connections to the components in a very limited space. Welding, soldering and micro-brazing techniques have not been successful in providing the high density of electrical connections which are required. In the known welding and brazing techniques, the pad member to which the micro miniature electrical connection is to be made is generally part of the electrical circuit and hence heat is generated therein. The heat generated in the pad member often interferes with other closely spaced brazes or welds.

In U.S. Pat. No. 3,384,958, a brazing method is disclosed wherein a small wire having a particular brazing material clad thereon is utilized. In this method, the electric current passes into the pad member to which the braze is to be made. However, the connection or braze made by this method is a lap braze connection which requires considerable space. If the wire is insulated, a separate insulation burning step is required to melt the insulation before the brazing step takes place.

Accordingly, it is the major object of this invention to provide a bonding system in which the wires are butt-brazed, that is, are connected to the pad element perpindicularly thus allowing a major reduction in the area required for termination.

It is another object of the present invention to provide a metallic bonding system in which error corrections can be made by cutting the existing wire off near the pad element and making a connection to the portion left on the pad element.

It is a further object of the present invention to provide a metallic bonding system in which burning through the insulation and the braze are accomplished in the same step.

It is a further object of the present invention to provide a metallic bonding system in which the miniature wires can be brazed to copper foil directly without the necessity of any gold plating.

The invention consists of a metallic bonding system for butt-brazing miniature wires which include a section of brazing material. A first conductive member is utilized which forms a first electrode and a second conductive member forms a second electrode. In each electrode a wire holding section is formed for holding these small composite wires near one end thereof. A power supply is connected across the two electrodes at one end thereof and a high resistance member is connected across the other end thereof. The power supply produces a controlled current pulse of sufficient duration to cause heating in the wire holding section to melt the insulation and contact the small composite wire which heats up sufficiently to cause the brazing material section of the small composite wire to form a braze between the end of the wire and the pad member.

The foregoing and other objects, features and advantages of the invention will be apparent from the following more particular description of a preferred embodiment of the invention, as illustrated in the accompanying drawings.

Figure 1:
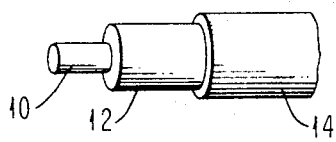
FIG. 1 is a schematic view of a miniature wire having a core of suitable brazing material.
Figure 2:
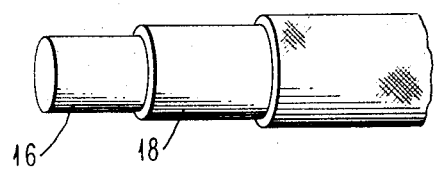
FIG. 2 is a further schematic diagram showing a miniature wire having the braze alloy clad to a copper core.

The wire to be used in this invention must contain a section of a braze material. One well known type of micro-miniature wire having a core of good brazing material is shown in FIG. 1. This core 10 can be one of the commerical brazing alloys, for example, the core can consist by weight of copper, (82.5 percent), silver (15.0 percent), and phosphate (2.5 percent). The core 10 generally has a diameter of about 0.001 inches. The core 10 is usually plated with a suitable conducting metal such as copper 12 for high thermal and electrical conductivity. This wire can be used in the invention either bare, for example in jumper and repair work, or can be insulated. The wire would normally be insulated with polyamide or polyurethane film 14. Another well known micro-miniature wire for use in the invention is one having a relatively pure copper core 16 to which is clad a brazing material 18 as shown in FIG. 2. One example of such a clad wire, is found in U. S. Pat. No. 3,384,958, filed June 30, 1965. The diameter of a typical wire having a clad brazing material 18 is 0.0031 inches. The practical range of diameters for such clad wires is 0.0001 – 0.0250 inches. It should be appreciated that the brazing material is comprised of copper, silver and phosphorus. It is self-fluxing due to the phosphorus and must be easily melted, and yet must result in a highly satisfactory braze or bond for an electrical connection. The brazing material clad 18 has a diametrical range of 1–10 percent of the clad wire diameter. In other words, the core 16 diameter constitutes 90–99 percent of the diameter of the clad wire. A 3 percent proportion is preferred and is equivalent to stating that the core diameter constitutes 97 percent of the clad wire diameter.

Figure 3:
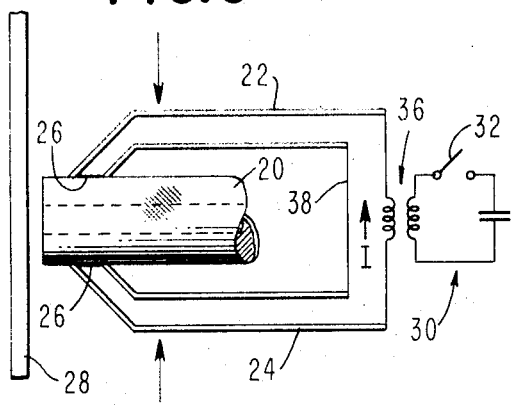
FIG. 3 is a schematic diagram showing a tweezer like holding and heating element at the beginning of the brazing cycle.
Figure 4:
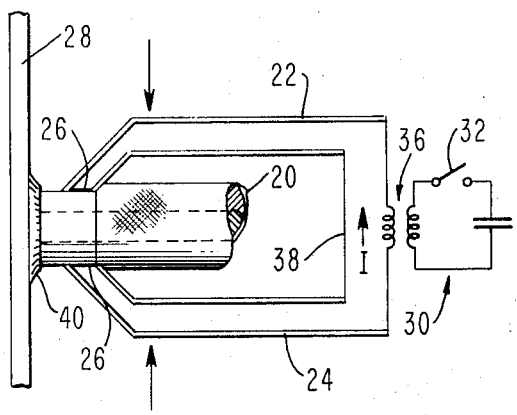
FIG. 4 is a further schematic diagram showing the tweezer-like holding and heating element at the finish of the operating cycle when the braze is complete.

At the beginning of the brazing cycle, the wire 20 having a brazing section included therethrough is positioned within or held by the apparatus as indicated in FIG. 3. The wire is held by a pair of tweezer-like conductive elements 22,24. As can be seen from FIGS. 3 and 4, the tweezers 22,24 can be hand manipulated so that the protruding portion of the wire 20 from the holding section 26 can be placed endwise against the pad 28 to which the clad wire is to be brazed before the brazing cycle starts. It will be appreciated that the tweezers 22,24 can be positioned by hand or by a brazing machine such as is shown and claimed in U. S. Pat. No. 3,263,059, filed Nov. 19, 1963. Once the wire 20 is positioned within the brazing apparatus and located for brazing against the clad element 28, a controlled current pulse is applied by the power supply 30 shown in FIGS. 3 or 4. The current pulse is applied by the closing of a suitable switch 32 in the power supply 30 which provides a path for the discharge of condenser 34 through the primary of the transformer 36. Accordingly, the current is induced in the secondary of the transformer which as shown in FIG. 3 provides a current I in the direction shown by the arrow. The current passes along a wire 22 in a first conductive element passing through a narrowed down portion forming a part of the wire holding section 26 of the tweezer-like elements 22,24. A second conductive member 24 forms the other member of the tweezers and has its one end connected to the other end of the secondary of the coil of the transformer 36. The other end of the conductive elements forming the tweezers are connected together by a relatively high resistance element 38 so that the path of the current pulse is down the conductive member 22 to the other end thereof, where the jumper element 38 is connected, through the jumper element 38 down the other conductive element 24 back to the other end of the secondary of the transformer 36 thus completing the electrical path. These first and second conductive elements 22,24 have essentially a U-shape with the bottom of the U bent in towards the wire 20 to be held to form the wire holding portion 26. The wire holding portion 26 can be a section of the conductive member or wire 22,24 that contacts the wire 20 to be held or it can be a special section of high resistance material. These first and second conductive elements 22,24 are insulated throughout their length except for the portions 26 which grip the wire 20. The narrowing of the conductive elements 22,24 at these non-insulated holding portions 26 creates a high resistance thus generating heat. When the conductors 22,24 forming the tweezers are utilized to grasp a wire 20, of the type described, near one end thereof, the heat generated by the current passing through the narrowed down portions will cause the adjacent insulation on the wire 20 to essentially melt allowing the conductive element wires 22,24 of the tweezers to contact the conductor of the wire being held. Once the conductor of the wire 20 being held is contacted by these electrical conductive elements 22,24, a path is set up from conductor to conductor through the wire 20. The amount of current passing through this newly established path is dependent on the resistance of the jumper 38 across the ends of the conductive elements 22,24. It will be appreciated, that a higher resistance jumper 38 will allow more current to pass through the newly created path through the wire being held. Accordingly, the choice of the resistance of the jumper element 38 is relatively important for the correct operation of the brazing apparatus of this invention. The current passing from the first conductive element 22 to the second conductive element 24 through the wire 20 being held must be sufficient to generate sufficient heat to cause the braze material section of the wire to reach the melt condition. This melt condition will cause a fillet of the braze material 40 to form between the end of the wire 20 and the pad element 28 to which the wire 20 is to be connected. The braze fillet 40, shown in FIG. 4, tends to flare out from the end of the wire 20 to make a metallic bond between the wire 20 and the pad element 28 which is larger than the wire diameter. The brazing material has a melt temperature of approximately 1,300°F., while the copper conductor of the wire to be brazed has a melting temperature of around 1,900°F. The amount of current needed to perform the brazing is typically a 0.003 second pulse which can be considered as providing a 0.0015 stripping and a 0.0015 brazing pulse. Control of the current is readily obtained through the current magnitude and duration. The actual braze made using the above techniques is very strong and the electrical connection has been found to withstand a force in excess of 20,000 PSI. Obviously, uninsulated wire can use the same technique but at a lower current magnitude or a shorter pulse duration.

The most important feature of generating the heat within the wire to be brazed by passing an electrical current thereacross is that the braze can be made to a pad element of almost any kind. For example, in conventional brazing or welding techniques it is necessary to pass the brazing or welding current through the conductive pad element 28. This limits the material to which the braze can be made as well as introduces the possibility of breaking adjacent brazes. Since no electrical connection is necessary, the braze can be made to copper foil which can be mounted directly to a ceramic substrate. Since no current is required to pass through the copper foil to which the braze is to be made, there is practically no limitation to the substrate material or to the material of the element to which the braze is to be made. Since an electrical connection does not have to be made between the pad element 28 and the wire 20 to be brazed thereto, there does not have to be good contact between the two before the brazing takes place as was necessary in any of the prior art brazing techniques. Since a good electrical contact does not have to be made between the two, the necessity for gold plating of the foil to which the electrical connection is to be made is no longer necessary. It has been found that good electrical connections can be made by this brazing technique for error correction and repair work. For example, the old connection can be cut off close to the braze and the new braze made to the stub remaining.

Another feature of the invention is that the substrate 42 can have a protective film 44 on the copper or other conductor 46. Usually the copper foil 46 is protected with a polyurethane film to keep the copper from oxidizing. In the type of invention described above, this film 44 presents no problem since it will melt during the brazing period as long as the film melt point is below the braze melt point. For example, the polyurethane film melts at around 800°F. whereas the braze material melts at approximately 1,300°F. It has been found, that the braze fillet 40 tends to very nicely fill the area of the film burnt away by the brazing cycle. Thus, the underlying electrically conductive foil 46 still has a continuous protective coating. That is, the underlying conductor is not left open to the ambient environment so that oxidation can take place. Furthermore, a badly oxidized copper substrate will still braze using the above system.

Figure 5:
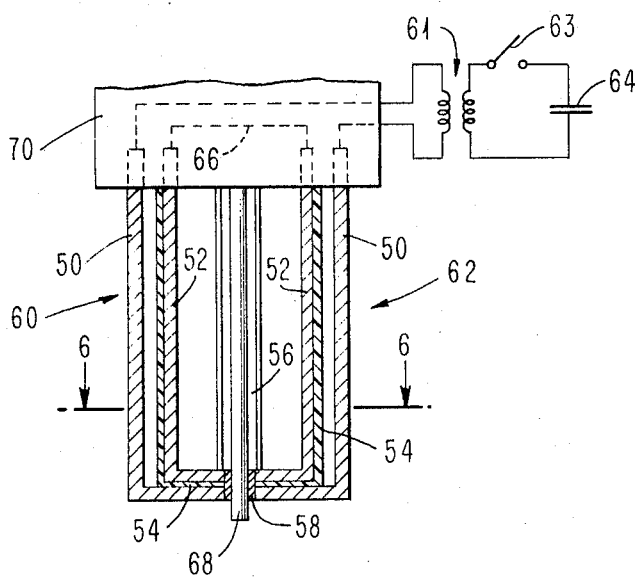
FIG. 5 is a cross section view of a further embodiment of the invention wherein the electrodes are cylindrical elements.
Figure 6:
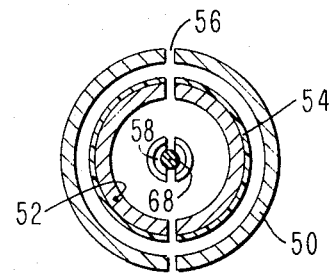
FIG. 6 is a cross sectional view taken along the line 6—6 of FIG. 5.
Figure 7:
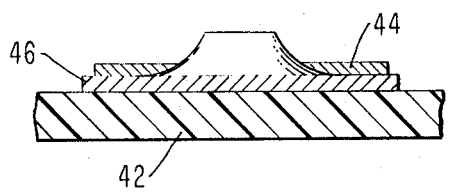
FIG. 7 is a further schematic diagram showing the braze formed through a protective film on the pad element.

Another embodiment of the invention is shown in FIG. 5 wherein the first and second conductive members can be made from a first and second cylindrical electrode members 50,52. These cylindrical electrodes 50,52 have have a very small diameter so that the unit can be utilized to make the braze in situations where a very high density of connections are necessary. The second cylindrical electrode 52 has a smaller diameter than the first cylindrical electrode 50 so that it can fit within the first cylindrical electrode 50 so that they are concentric. The two electrodes 50,52 are separated by a coating of insulation 54 which can be deposited on either the inside of the first or outer electrode 50 or on the outside of the inner electrode 52. This insulation 54 can be a very thin film of glass which can be electrodeposited thereon. The concentric tubular members 50,52 are shown at the bottom ends thereof as being bent into the center. This can also be accomplished by connecting the tubular members 50,52 to washer shape members which are spaced from one another and separated by the insulation 54. Of course, these washer-like members can be made of the same material as the tubular members. The tubular members are made of a good conductive material such as 0.001 inch thick steel. The bent-in edges of the tubular members can be connected together by a ring or coating 58 having a high resistance, such as molybdenum, to provide an electrical path between the inner and outer electrodes. This ring 58 of molybdenum can also serve as the holding member for the wire to be brazed. As can be seen from FIGS. 5 and 6, the cylindrical members are cut in two along the diameter to provide a slot 56 essentially dividing the cylindrical members into two half cylindrical members 60,62. Accordingly, the molybdenum ring 58 is also split so that we have two half rings with a space therebetween the width of the slot 56. These molybdenum half rings 58 or other high resistance material form a holding member for the wire to be brazed which is inserted through the inner cylindrical member 52. As can be seen from FIG. 5, the two half cylindrical members 60,62 can be pressed together to grip the wire extending through the bottom end of the inner cylindrical member 52. As was the case in the prior example, a current pulse is applied to the outer cylindrical electrode 50 by means of a current pulse generated through the secondary of a transformer 60. Upon the energization of a switch 62, a condenser 64 is discharged through the transformer 60 in the form of a current pulse. The current pulse travels down the outer electrode of the half cylinder member 60 through the molybdenum half ring 58 and up the inner cylindrical member 52 of the same half cylindrical member. The half cylindrical members 60,62 are electrically connected via a high resistance electrical conductor 66 extending between the inner electrode 52 at the top end thereof. The passage of the current pulse through the molybdenum interconnector 58 generates sufficient heat to burn the insulation from the wire 68 held therein. Once the insulation is burned through, the molybdenum interconnectors 58 are shorted by the bare wire 68 and the current passes therethrough heating up the braze section of the wire which melts and forms the braze at the end of the wire 68. The half cylindrical members are held in a housing 70 at the top end thereof. The half cylindrical members have a certain amount of give so that they can be pressed onto the wire to hold and burn therethrough. It will be appreciated that the wire can be held in place within the holding members of the half cylindrical electrodes, that is, the molybdenum half circles grip the wire when pressed thereon by the operator or the arrangement could have a screw down member which causes the half cylindrical members to press inward for automatic operation. The wire 68 to be brazed is fed through the opening within the inner cylindrical member 52. The wire 68 is gripped near the end so that the melting of the braze section can take place at the required tip.

Accordingly, the braze or metallic bond between the micro-miniature wire 20 and the pad element 28 is made by providing through wire forming techniques a small composite wire 20 having a section thereof made up of a brazing material. The pad member 28 is provided to which the small composite wire 20 is to be brazed. The wire 20 is held so that the high resistance portions of an electrical circuit contact the wire 20 near the end thereof and the wire is arranged such that the end to be butt brazed is held against the pad member 28. When the wire 20 is so-positioned, a controlled electrical current pulse is applied so that an electrical current path is formed in the wire 20 of sufficient duration to cause heating so that the braze material section of the wire 20 melts onto pad member 28. Of course, the wire 20 can be encased in insulation. This requires a longer or higher current pulse to the high resistance portion of the electrical circuit so that sufficient heat is generated to melt the insulation thus allowing the electrical current to pass across the wire. It will be appreciated that the pad member 28 can have a protective film coating 44 thereon which is burned-off so that the braze can take place to the underlying conductive member 46. This is accomplished during the braze since the melting point of the film is less than the melting point of the braze section of the wire 20.

While the invention has been particularly shown and described with reference to a preferred embodiment thereof, it will be understood by those skilled in the art that various changes in form and detail may be made therein without departing from the spirit and scope of the invention.

What is claimed is:

1. A metallic bonding system for butt brazing miniature wires comprising:
   a small composite wire which includes a brazing material;
   a pad member comprising a surface to which a braze can be made by said brazing material of said small composite wire when butted thereto;
   a first electrode comprising a first conductive member;
   a second electrode comprising a second conductive member;
   a high resistance wire holding means connected into each of said first and second conductive members for holding said small composite wire near one end thereof so that the end can be butted against said pad member surface;
   a high resistance member connected across one end of each of said first and second conductive members; and
   a power supply means connected across the other ends of each of said first and second conductive members for producing a controlled current pulse of sufficient duration to cause heating in said high resistance wire holding sections to melt the insulation and contact said small composite wire, thereby completing a circuit across said small composite wire which heats up sufficiently to cause said brazing material section of the small composite wire to form a braze between the end of said wire and said pad member.

2. A metallic bonding system according to claim 1, wherein said small composite wire has a core of brazing material surrounded by an electrical conductor which is enclosed in a film of insulation.

3. A metallic bonding system according to claim 1, wherein said small composite wire has an electrical conductive wire core having a brazing material clad thereto and a coating of insulation covering said brazing material.

4. A metallic bonding system according to claim 1, wherein said first and second electrodes each comprise a thin electrically conductive wire formed into a U-shape having a flat bottom, the flat bottom of each U-shape electrode is turned toward one another so that the flat bottom of each U-shaped electrode is parallel to one another, said flat bottom of each U-shaped electrode comprising one of said high resistance wire holding means.

5. A metallic bonding system according to claim 1, wherein each of said high resistance wire holding means consists of a high resistance conductive wire connected into said first and second electrodes, respectively said high resistance wire holding sections being electrically energized by said power supply means through said electrodes and said high resistance member connecting said electrodes.

6. A metallic bonding system according to claim 1, wherein said first conductive member comprises a first pair of half cylindrical members and said second conductive member comprises a second pair of half cylindrical members, means for insulating said half cylindrical members in each pair from one another, said high resistance wire holding section comprising an electrical conductive member connected across said insulation between half cylindrical members of each pair, said first and second pair of half cylindrical members being formed from a first cylindrical electrode and a second cylindrical electrode which fits inside said first cylindrical electrode, insulation is located between said first and second cylinders, said first and second cylindrical electrodes being cut along the common diameter to form said first and second half cylindrical members.

7. A metallic bonding system according to claim 6, wherein said high resistance member connected across the other ends of each of said first and second conductive elements is connected across the inner half cylindrical member of each of said first and second pair of half cylindrical members and said power supply means is connected across the outer half cylindrical members to complete the circuit through said high resistance holding means in series.

* * * * *